INVENTOR.
JOSEPH C. BASSO
BY
ATTORNEYS

INVENTOR.
JOSEPH C. BASSO
BY
ATTORNEYS

FIG. 4.

April 13, 1965 J. C. BASSO 3,177,742
METHOD FOR POSITIONING A WORK PIECE IN A MACHINE TOOL
Filed June 22, 1960 6 Sheets-Sheet 4

INVENTOR.
JOSEPH C. BASSO
BY
ATTORNEYS

INVENTOR.
JOSEPH C. BASSO
BY
ATTORNEYS

FIG. 9.

INVENTOR.
JOSEPH C. BASSO 3,177,742
METHOD FOR POSITIONING A WORK PIECE
IN A MACHINE TOOL
Joseph C. Basso, Trenton, N.J., assignor, by mesne assignments, to De Laval Turbine Inc., Trenton, N.J., a corporation of Delaware
Filed June 22, 1960, Ser. No. 38,052
7 Claims. (Cl. 82—1)

This invention is directed to a method and apparatus for positioning a work piece in machines such as lathes, grinders and the like.

In lathes, grinders and the like where it is desired to have a very accurate work piece roundness and minimum eccentricity, it is essential that the male and female centers for supporting the work piece be in alignment with each other within a close tolerance. If the supporting centers are misaligned the work piece will wobble as it rotates during the grinding or cutting operation causing lobes to be formed thereon. This is undesirable in many applications, as for example, in the manufacture of journals, where lobes will result in unbalanced operation of the journal.

It is also desirable that the female centers be centrally positioned with respect to the work piece so that there will be a minimum of "humping" as the work piece rotates. Humping results from a high point on the work piece with respect to the work piece supporting center.

One problem that is encountered in positioning a work piece in machines of the indicated type is that no adequate technique has been found to align the headend and the tailend centers when they must be spaced a considerable distance for mounting a long work piece. In the usual practice, the centers are aligned at a close position and then the tailend center is retracted to the position necessary to receive the work piece. During this retracting movement, the centers are moved out of alignment by reason of the slight misalignment of the machine track for guiding the tailstock movement. This slight track misalignment is found in almost all machines of the indicated type.

Another problem that is encountered results from the lubrication of the bearing surface between the male and female centers. Since it is difficult to obtain adequate lubrication at this bearing surface, the female centers used in the past are provided with grooves extending in a straight line along the conical surface of the female center in an axial direction. While such a construction does provide some oil to the bearing surface, the linear grooves cause dead spots which cause a dipping action as the work piece rotates to cause small projections to be formed thereon.

It is an object of the present invention to provide a novel adjustable center assembly for mounting a work piece on a machine of the indicated type.

Another object of this invention is to align the work piece supporting centers by a method which will overcome the aforementioned problems of misalignment.

The above and other objects and features of the invention will become apparent from a consideration of the following description read in conjunction with the accompanying drawings, in which.

Figure 2:
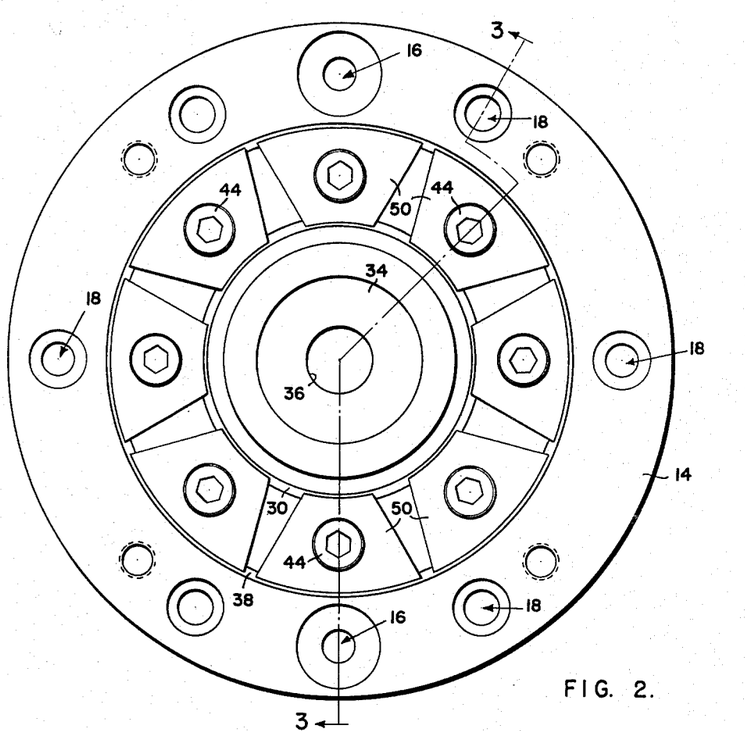
FIGURE 2 is a view of an adjustable female center assembly in accordance with this invention.
Figure 3:
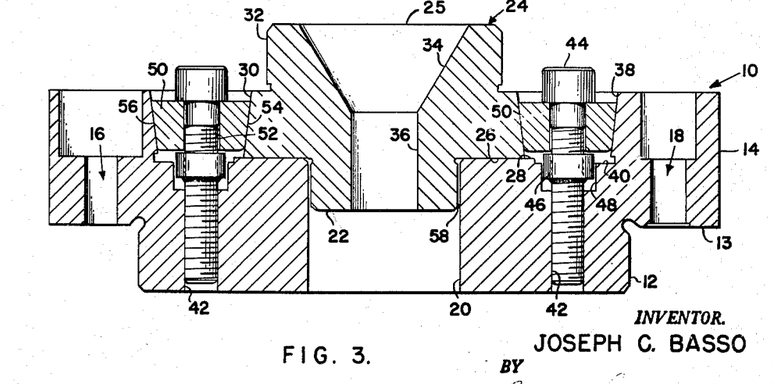
FIGURE 3 is a section taken on a plane indicated by the line 3—3 of FIGURE 2.

The female adjustable center assembly, which is shown in FIGURES 2 and 3, comprises a substantially cylindrical supporting member or plug 10 which has cylindrical portion 12 which may be adapted to project into a work piece. Portion 12 is adjacent a flange portion 14 which is adapted to be used for attaching the plug 10 to the work piece and has a radial shoulder 13. Portion 14 has a pair of oppositely disposed, counterbored holes 16 adapted to receive tapered pins for dowelling the plug 10 to the work piece. Portion 14 also has six circumferentially spaced, counterbored holes 18 adapted to receive bolts which are threaded into the work piece.

Plug 10 has a central bore 20 adapted to receive a projecting end 22 of a female center 24. The center 24 has an annular shoulder 26 adapted to slidably contact an annular shoulder 28 formed on plug 10 adjacent central bore 22 and extending perpendicularly to the axis of plug 10. The center 24 has a conical rim portion 30 inclined at an angle of 6° from shoulder 26 and a cylindrical rim portion 32 projecting from plug 10. The center 24 also has a conical bore 34 joined by a cylindrical bore 36, which bores are adapted to receive a male center. The conical bore 34 has a 60° apex angle and is formed so that the axis thereof coincides with the axis of rim 32 within a tolerance of ten millionths of an inch whereby a roundness test reading on rim 32 will, in effect, be a reading of the conical bore 34. Shoulders 12, 13 and 28 are accurately machined so as to be perpendicular and parallel to the axis of plug 10 within an accuracy of two ten thousandths of an inch. Shoulder 26 and the front face 25 of center 24 are square with respect to the center axis within ten millionths of an inch. Thus, the lateral movement of center 24 and the front face 25 with respect to the adjustable center assembly is very accurate.

Plug 10 has an inwardly facing conical rim 38 oppositely disposed from rim 30 and having a 6° inclination opposite to the inclination of rim 30. The plug 10 also has an annular recess 40 concentrically bounding shoulder 28 and eight circumferentially equally spaced threaded holes 42 extending axially of plug 10 and recess 40. A plurality of bolts 44 threadedly engage holes 42 and have a collar 46 welded thereon at a central portion thereof. Collars 46 are adapted to be received in counterbores 48 of holes 42. A wedge 50 is mounted on each bolt 44 between the bolthead and the collar 46. The bolt 44 passes through a central bore 52 in the wedge 50. Collar 46 is spaced from the bolthead a distance greater than the wedge thickness and bore 52 is slightly greater than the diameter of the bolt whereby the wedges 50 and the bolts 44 are slidable relative to each other. Each of the wedges 50 has a face 54 shaped to conform to and contact the conical rim 30 of center 24 and a face 56 shaped to conform to and contact the conical rim 38 on plug 10.

The center 24 is adjustable laterally by movement of the wedges 50 which cam the center 24 laterally with shoulders 26 and 28 serving to guide the adjusting movement perpendicular to the center assembly axis. Rotation of the bolts 44 in a direction to cause axial movement thereof into the holes 42 forces the wedges 50 inwardly, by means of the wedge being contacted by the bolthead, to thereby cam center 24 laterally toward the center assembly axis. Since this movement will be resisted by the wedges oppositely disposed from the adjusting wedges, the resisting wedges are loosened to permit the desired center movement. In order to loosen the wedges, the bolts thereof are rotated in a direction causing axial movement out of the engaging holes whereby the collars 46 contact the wedges 50 to cause a corresponding wedge movement. By suitable manipulation of the wedges 50 by the bolts 44, the center 24 may be adjusted to a desired position which may be measured by suitable means to be hereinafter described.

The range of adjustment of center 24 is limited by the spacing between the projecting center end 22 and the bore 20, which space is indicated at 58. This space will not ordinarily be very large by reason of the accurate machining of the whole center assembly. Since the adjustment of center 24 is relatively small, the axial movement of the wedges 50 is also relatively small. Thus, there is no problem of non-sitting of the conical surfaces 54 and 56 of the wedges 50. Hence, the radius of curvature of surface 54 may be substantially the same as the radius of curvature of its cooperating conical rim 30 and the radius of curvature of the surface 56 may be substantially the same as its cooperating surface 38.

Figure 10:
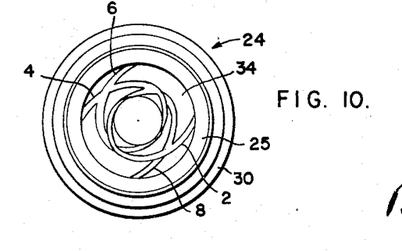
FIGURE 10 is an elevational view of a female center having oil grooves in accordance with this invention.

In order to eliminate dead spots and increase the flow of oil between the male and female contact surfaces the female center 24 may be constructed as shown in FIGURE 10. In this form of female center, the conical portion 34 has a pair of spiral grooves 2 and 4 running in a clockwise direction and a pair of spiral grooves 6 and 8 running in a counterclockwise direction. Each of the grooves extends from the outer end of conical portion 34 and a distance greater than 180° angularly about the surface of conical portion 34. By this construction there is no radial portion on conical portion 34 where the male center would not contact a substantial area of the surface of conical portion 34 whereby there will be no dead spots. Also the spiral grooves serve to pull oil toward the inner portion of the center as the center rotates to thereby provide a better lubrication between the male and female centers.

Figure 4:
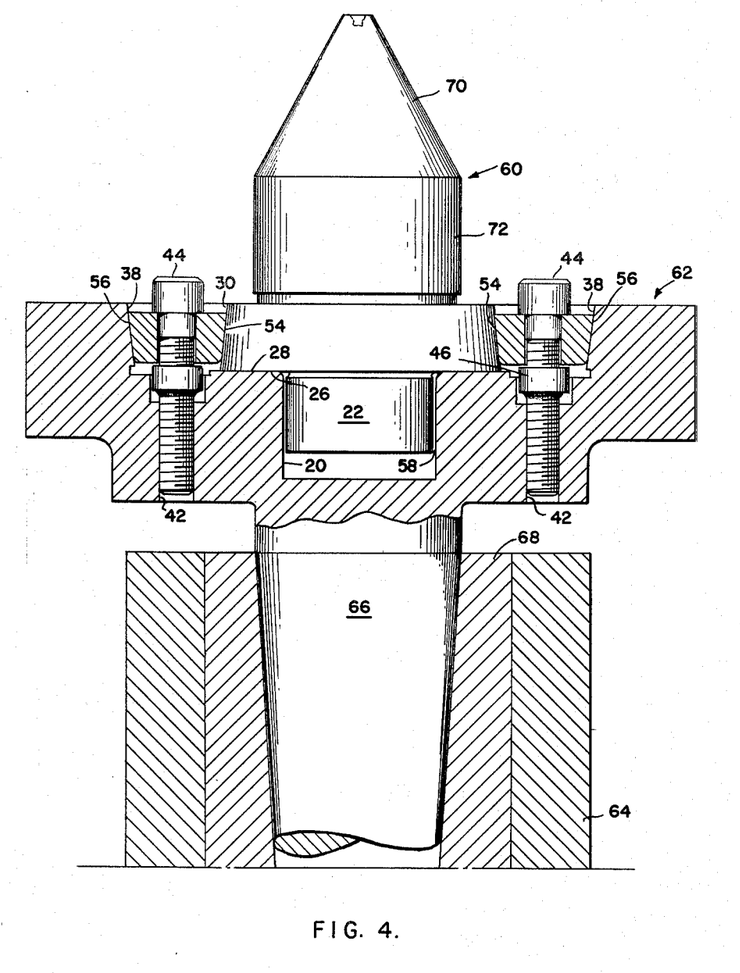
FIGURE 4 is a sectional view of an adjustable male center assembly in accordance with this invention.

The adjustable male center assembly shown in FIGURE 4 is similar to the female center assembly and like parts have been given the same reference numerals. The male assembly may have a similar wedge arrangement for adjusting the center 60 thereof. There are no dowel or attaching holes required since the male plug 62 is supported on the lathe tailstock 64 by means of a projecting end 66 having a Jarno taper fitted into a sleeve 68 mounted in the tailstock 64. Instead of a conical female bore, a male conical projection 70 joined with a cylindrical portion 72 is provided to form the male center 60. The axes of conical projection 70 and cylindrical portion 72 are in alignment within an accuracy of 20 to 30 millionths of an inch. Conical projection 70 is adapted to coact with a female center and has an apex angle of 60°. The male center 60 is adjusted by means of the wedges 50 in the same manner as the female center 24.

The adjustable center assemblies in accordance with this invention permit very minute adjustments by reason of the wedge arrangement. It is noted that the adjustments are ultimately determined by the advancing movement of the bolts, which is dependent on pitch of the bolt threads. Thus, the center may be adjusted a very small distance so that very accurate center positions may be attained. Also, the eight wedges contacting the center at eight arcs provide a very rigid support for the center. Smaller diameter center assemblies may employ four wedges.

Figure 7:
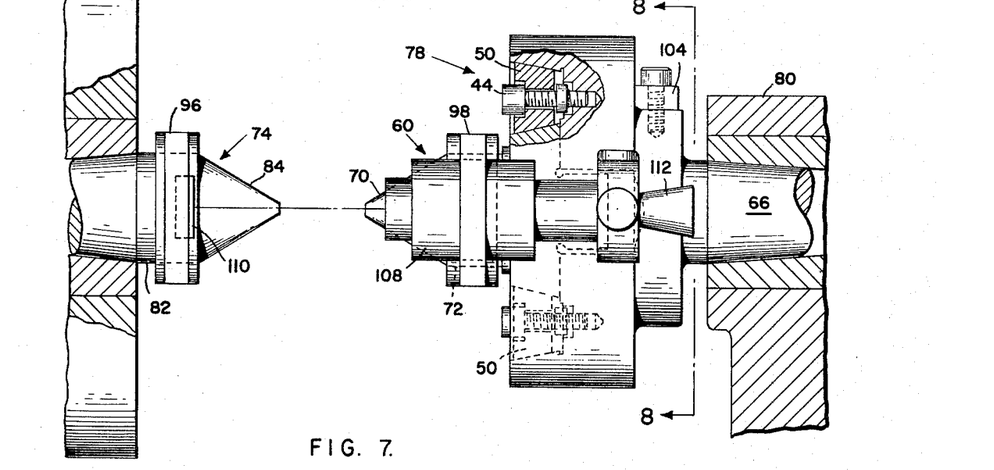
FIGURE 7 is an elevational view of the apparatus shown in FIGURE 6.

The apparatus in accordance with this invention comprises a stationary male center 74 mounted in the machine headstock 76 by a Jarno taper arrangement. An adjustable male center assembly 78 similar to that disclosed in FIGURE 4 is mounted on the tailstock 80 by a Jarno taper arrangement at projecting end 66. Adjustable assembly 78 is mounted on tailstock 80 so that the center 60 thereof is in approximate axial alignment with stationary center 74. Stationary center 74 is constructed in the same manner as male center 60 with a cylindrical portion 82 accurately formed relative to a conical portion 84. As is best shown in FIGURE 7, center 60 will be adjustable to a position of alignment by adjustment of the wedges 50.

If the male centers are to be spaced a distance less than approximately four feet, there may be no need to have an adjustable male center at the tailend of the machine. In this case, the required adjustments are generally so small that these can be made by scraping the bed of the tailstock in a manner which is well-known in the art. However, where the spacing of the male centers is greater than four feet, an adjustable male center such as 78 should be employed at the tailend of the machine which is the case in the procedure described hereinafter.

Figure 1A:
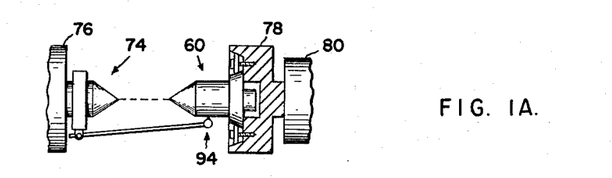
FIGURES 1A to 1E are schematic illustrations of the procedural steps in accordance with the present invention.
Figure 5:
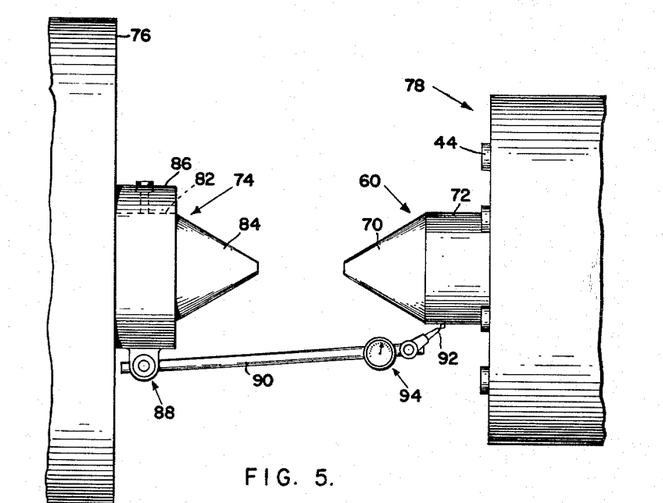
FIGURE 5 is a plan view of the apparatus employed in the first step in the procedure in accordance with this invention.

The first procedural step in positioning a work piece in a machine is illustrated schematically in FIGURE 1A and involves aligning the male centers 74 and 60 at a relatively closely spaced position, which spacing may be of the order of twelve inches. Such alignment is to be within one thousandth of an inch and may be obtained by a suitable dial gauge apparatus as is illustrated in FIGURE 5. Such apparatus comprises an adjustable sleeve 86 which is positioned on the cylindrical portion 82 of center 74. Sleeve 86 has a support member 88 carrying a rod 90 extending longitudinally of center 74 to a position in which a feeler 92 of a dial gauge means 94 carried by rod 90 contacts the cylindrical portion 72 of adjustable center 60. The position of feeler 92 gives a dial gauge reading so that the center misalignment may be determined by taking a plurality of readings about the periphery of cylindrical portion 72. These readings are made by rotating the sleeve 88 about the center 74 to various reading positions. In order that these readings may be accurate, sleeve 86 is machined to fit closely on cylindrical portion 82. Dial gauges of the indicated type are well-known in the art and further description thereof is deemed unnecessary.

It will be noted that the cylindrical portions 72 and 82 are machined to be accurate with respect to the center conical portions 70 and 84, respectively, within 20 to 30 millionths of an inch. Thus the positioning of sleeve 86 on cylindrical portion 82 will correspond accurately to the conical portion 84 and a reading on the cylindrical portion 72 will, in effect, be a reading of the relative position of the conical center portions 70 and 84.

Any misalignment of center 60 will be corrected by adjusting the wedges 50. After the centers 60 and 74 are aligned to within one thousandth of an inch, the dial gauge apparatus is removed. It will be noted that this type of setup would not be satisfactory to align the centers at a considerable spacing because of the need for a long bar which would be subject to deflection.

Figure 8:
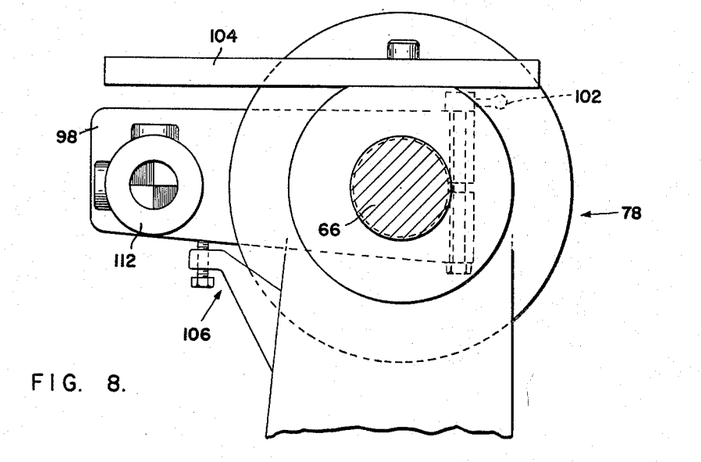
FIGURE 8 is a view taken on a plane indicated by line 8—8 in FIGURE 7.

The next step is illustrated in FIGURES 1B, 6, 7 and 8 and involves mounting an elongated bracket 96 on the cylindrical portion 82 of stationary center 74 and an elongated bracket 98 on the cylindrical portion 72 of adjustable center 60. The brackets 96 and 98 are rotatable to various positions on portions 72 and 82, respectively, and are fixed at the desired position by tightening clamping screws 100 and 102, respectively. Brackets 96 and 98 are fixed in a position parallel to a reference bar 104 which is fixedly mounted on plug member 10 of the adjustable center assembly 78 and are thus parallel to each other. Suitable levels may be used to indicate the parallel position of the brackets 96 and 98. In order to more accurately position the brackets 96 and 98 in parallel, the reading head of an indicating mechanism which is mounted for horizontal movement is moved across the top faces of the brackets 96 and 98 and indicating bar 104. The indicating mechanism will indicate the vertical difference between the outer and inner ends of the brackets 96 and 98 and the bar 104. The reference bar 104 also serves to permit a check of whether the bracket has been jarred out of position during the retracting movement of the tailstock. Thus, the parallel position of bracket 96 may be checked with reference bar 104 at the spaced position and there is no need to return the tailstock to a position close to bracket 98 in order to check the parallelism of these brackets. As shown in FIGURE 8, an adjustable support 106 for bracket 98 may be used for fine adjustment.

Figure 6:
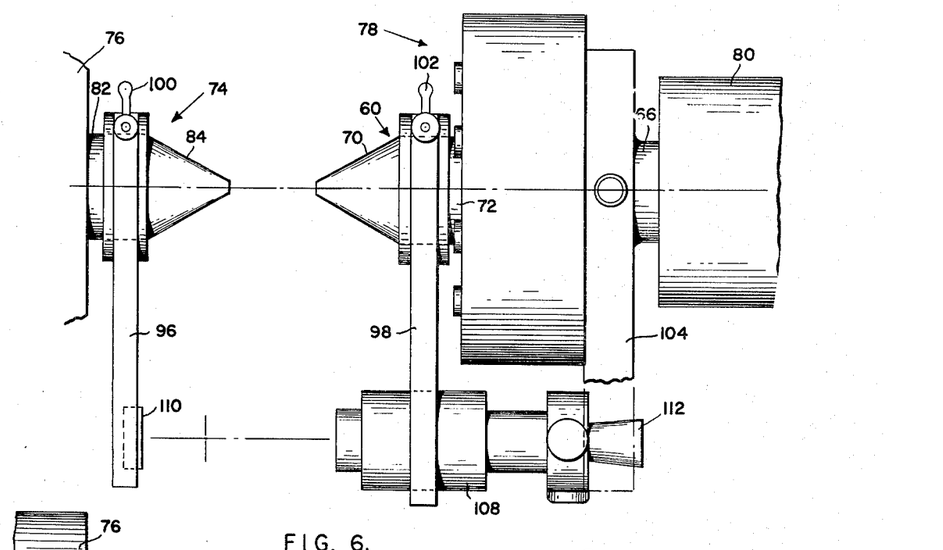
FIGURE 6 is a plan view showing the apparatus employed in a subsequent step in the procedure in accordance with this invention.

Bracket 98 carries an aligning telescope 108 at the extending end thereof and bracket 96 carries a target 110 in the line of sight of telescope 108. Telescope 108 is moutned on a ball joint to permit tilting thereof. Brackets 96 and 98 are made identically so that the spacing of the target center from the axis of center 74 is equal to the spacing of the center of the line of sight of telescope 108 from the axis of center 60. After the brackets 96 and 98 are mounted on centers 74 and 60, respectively, in the above manner, the verniers of the telescope 108 are set to zero by sighting through the eyepiece of the telescope 108 and moving the latter on its ball joint mounting. It is to be noted that the centers 60 and 74 are now in axial alignment and the telescope line of sight and the target center are in alignment along an axis parallel to and spaced from the aligned axis of centers 60 and 78.

By retracting the tailstock 80, the centers 60 and 74 are then separated a distance in accordance with the length of the work piece, which distance may be of the order of one hundred inches. This separated position is illustrated in FIGURE 1C wherein the line 114 designates the path of movement of center 60, the line 115 designates the axis of center 60, the line 116 designates the axis of center alignment, the line 118 designates the actual line of sight of telescope 108 and the line 120 designates an axis parallel to the axis of center alignment and passing through the center of target 110. Line 114 thus illustrates the path of the machine track guiding the tailstock movement and that this track has caused misalignment of the centers at the 100 inch position. This alignment may be readily determined by sighting through the eyepiece 112 of the telescope 108 which will indicate both the horizontal and vertical misalignment. The telescope may be provided with dials for measuring the horizontal and vertical displacement from the target center. It is to be noted that the adjustable center assembly 78 is fixedly mounted on the tailstock so that there will be no rotation during the retraction of the tailstock to the 100 inch position.

In machines of the indicated type, such as lathes, grinders and the like, the curvature of the track is generally negligible and will not cause any appreciable tilting of the tailend center with respect to the female center. Moreover, the small amount of contact between the male and female centers tends to minimize the effect of any tilting.

Figure 1B:
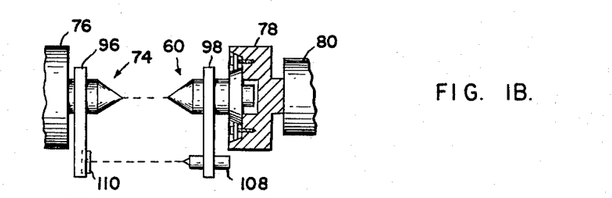
Figure 1C:
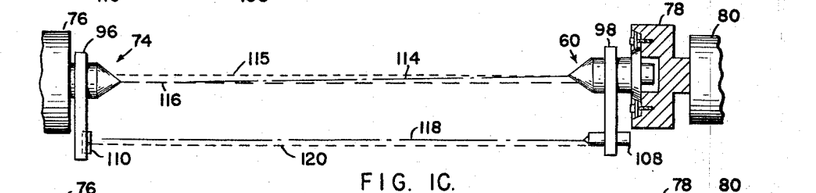
Figure 1D:
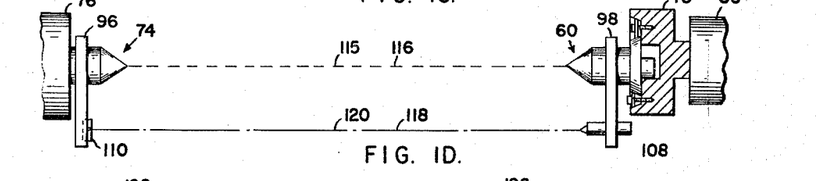

In order to bring about the center alignment at the 100 inch position, center 60 is adjusted by means of wedges 50 until the actual line of sight of telescope 108, i.e. line 118, passes through the target center as was the case at the twelve inch aligned position as shown in FIGURE 1B. Since the line of sight of telescope 108 is in a fixed relationship to the center 60 by reason of bracket 98 and the target center is in the same fixed relationship with center 74 by reason of bracket 96, alignment of the line of sight of telescope 108 with a target center will bring the centers 74 and 60 in alignment. The alignment is brought about by sighting through the telescope after each center adjustment until the crossbars of the telescope cross the target center. This aligned position is illustrated in FIGURE 1D wherein the lines 118 and 120 coincide and the center 60 is in alignment with the center 74. The accuracy of alignment in this position will be one thousandth of an inch which is the same as the accuracy originally set at the twelve inch position.

It is to be noted that in the above alignment proecdure, the cylindrical portions of the centers are used as the reference surfaces. However, the conical portions, which serve to support the work piece, will also be aligned since the centers are machined so that the axes of the conical and cylindrical portions coincide within an accuracy of 20 to 30 millionths of an inch. The brackets 96 and 98 are now removed and the machine is locked up with the centers prepared to receive a work piece.

When mounting the work piece on the male centers 60 and 74, the tailend center 60 is forced axially into its associated female center to form a tight fit at both the headend and tailend centers. It will be thus apparent that if the female centers were formed in the ends of the work piece and were misaligned, the female centers would be cocked relative to the male centers and the work piece would be tilted or wobble when assembled to the male centers. To avoid this wobbling, at least one female center should be of the adjustable type so that it may be adjusted to eliminate any lobbing in the final results. If the centers are to be concentric with the work piece as, for example, where it is desired that a minimum of material be removed from the work piece, and adjustable female center assembly is used at each end of the work piece.

Figure 1E:
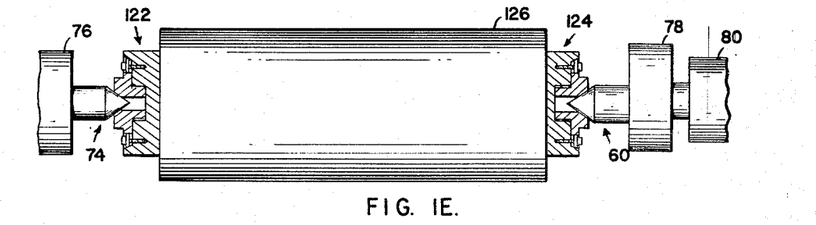
Figure 9:
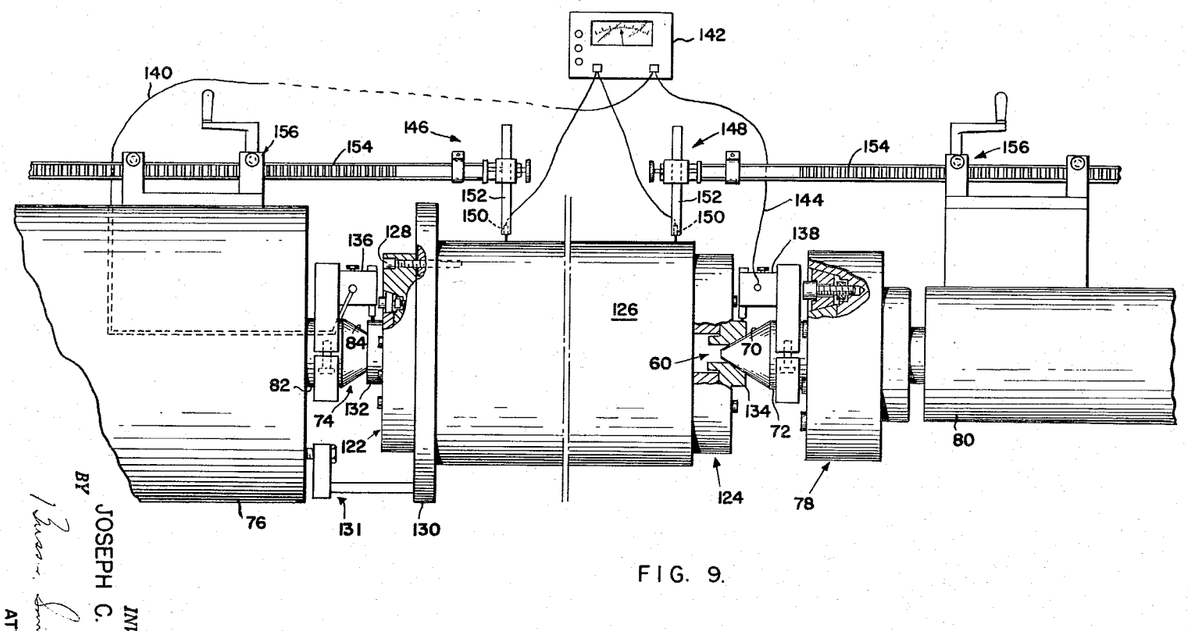
FIGURE 9 is a view showing the apparatus employed in a further step in the procedure in accordance with the present invention.

The next step is to attach the female centers to the work piece and to mount the work piece on the male centers. FIGURES 1E and 9 illustrate this step and disclose a pair of adjustable female center assemblies 122 and 124 attached on the headend and the tailend of the work piece 126, respectively. The female center assemblies are fitted and attached to the work piece 126 by means of dowel pins (not shown) and bolts 128 which extend through the holes 16 and 18, respectively, in the plug member, the holes being shown in FIGURES 2 and 3. The female center assembly 122 is adapted to attach an annular member 130 to the work piece, which may be engageable by the headstock drive 131 for rotating the work piece during the machining operation.

Before the female centers 122 and 124 are attached to the work piece, the end faces thereof are machined to be square within an accuracy of two ten thousandths of an inch. Then the female center assemblies 122 and 124 are attached to the work piece and the centers 132 and 134 of center assemblies 122 and 124 are squared to within one ten thousandths of an inch. This squaring procedure involves the scraping of abutting shoulders 26 and 28 (FIGURE 3) to adjust the female center position in accordance with readings of a suitable electronic indicator mechanism which includes a gauge head for contacting the centers at face 25 (FIGURE 3) and means for indicating the variations of a gauge head reading. Such electronic indicating mechanisms are well known in the art and description thereof is deemed unnecessary.

After attaching the female center assemblies 122 and 124 to the work piece and squaring the centers 132 and 134 the assembled apparatus is mounted on the male centers 60 and 74 as shown in FIGURE 9. The next step involves alignment of female centers 132 and 134 by adjustment of the wedges thereof. The mechanism for testing the alignment of the centers 132 and 134 may be of any suitable form of gauging apparatus of which there are many well known in the art. The form preferably used is an electronic indicator which is also adaptable for the measurement of roundness which will be described hereinafter. These mechanisms may be purchased on the open market.

The indicator comprises a pair of master gauges 136 and 138 carried by supporting members detachably mounted on the male centers 74 and 60 so that the feelers of master gauges 136 and 138 run on the cylindrical surfaces of female centers 132 and 134, respectively. Master gauge 136 is electrically connected, by means of a wire 140 passing through the headstock 76 to a control and indicating mechanism 142. Master gauge 138 is electrically connected to the mechanism 142 by a wire 144. The mechanism 142 has a scale and pointer arrangement for indicating the gauge reading variations and switching means for connecting either of the master gauges 136 or 138 to the means for actuating the pointer in accordance with the gauge reading. The mechanism 142 may also be connected to a recording means for making a polar chart of the gauge readings, a procedure well known in the art.

The procedure of aligning the centers 132 and 134 involves rotation of the work piece slowly and reading each of the master gauges 136 and 138 successively through a full revolution. Each reading is taken during a revolution having the same starting point. If the centers 132 and 134 are not in alignment they are cocked relative to the male centers 60 and 74 whereby as the female centers are rotated there will be a high reading at different angular positions for each of the centers 132 and 134. Alternate steps of center adjustment and dial gauge readings are made until the high reading of the centers 132 and 134 are in alignment whereby the axes of the centers 132 and 134 will be aligned within the desired accuracy. This reduces the wobble as the work piece rotates to the ultimate degree. If the aligned centers 132 and 134 are not centrally located with respect to the work piece, there will be a humping action as the work piece rotates. The amount of humping is read by the headend gauge assembly 146 and the tailend assembly 148 which are identical. The gauge assemblies 146 and 148 each comprise a gauge head 150 mounted on a laterally movable arm 152 carried by a longitudinally movable rack member 154 operated by a pinion arrangement 156. The feelers of the gauge head 150 are electrically connected to the control and indicating mechanism 142. Thus, as the work piece is rotated, the mechanism 142 may be set to indicate the amount of humping. It will be noted that if the amount of humping is within the tolerance required for the final work piece, no adjustment of the centers toward a central location with respect to the work piece is required. If the humping is too great, however, the centers may be adjusted toward the center of the work piece.

The work piece is now in a position to be operated on by the machine which may be a lathe, grinder, or the like adapted to form a round surface on the work piece at the desired diameter. During this operation, the electrical indicating mechanism is used to test for roundness of the work piece. By moving the gauge 150 of the assemblies 146 and 148 to various axial positions on the work piece and making a polar chart for one revolution of the drive mechanism, the roundness of the work piece may be tested, one turn of the work piece being equivalent to one turn of the polar chart. The test polar chart may be compared with a master chart to give a reading related to the difference in two coplanar concentric circles which just contain the profile of the surface being tested. This, of course, gives a true indication of the roundness of the surface of the work piece.

It will be apparent that the reading of the gauge head 150 on the work piece will be affected by the variations in the thickness of the oil film between the male and female centers supporting the work piece. To demonstrate that this effect is negligible, a polar chart reading may be taken of the difference between the reading of a gauge head 150 and an adjacent master gauge. Such differential readings are possible with the electronic indicator to be used with the procedure in accordance with this invention. This reading will no longer be affected by the oil film thickness variations since the female center is in a fixed relationship with respect to the work piece. If the roundness test by the gauge 150 and the roundness test by the differential reading result in approximately the same deviation from roundness, it is apparent that the reading at the gauge 150 is accurate.

It will be understood that the invention is not to be regarded as limited by the specific disclosure herein but only by the scope of the following claims.

What is claimed is:

1. The method of positioning a work piece in a machine such as a lathe, grinder or the like comprising the steps of aligning the headend and tailend male centers of the machine at a close position, said tailend male center being mounted on an adjustable center assembly, retracting the tailend male center to a position for receiving the work piece, realigning said male centers at said retracted position by adjusting the position of the tailend center by means of the adjustable center assembly, placing female center assemblies at the ends of the work piece, said female center assemblies have a center member defining a female center, the center member of at least one of the center assemblies being mounted for adjustment, each of said center members having a bearing portion adapted to be seated on the male centers of the machine and a wall portion extending about the female center and concentric therewith, mounting the work piece on said male centers of the machine with the bearing portion of the female center members bearing on said male centers, gauging any misalignment of said female centers with the work piece mounted on the male centers, said gauging step including sensing of the position of said wall portions of the center members at aligned locations at each end of the work piece for a plurality of angular positons of the work piece by means of gauges contacting said wall portions, and aligning said female centers by adjustment of the adjustable female center until the high readings of the gauges sensing the wall portions at each end of the work piece are approximately in alignment.

2. The method of positioning a work piece in a machine such as a lathe, grinder or the like comprising the steps of aligning the headend and tailend male centers of the machine at a close position, retracting the tailend male center to a position for receiving the work piece, realigning said male centers at said retracted position by adjusting the position of the tailend center, placing adjustable female center assemblies at the ends of the work piece, said female center assemblies having a center member mounted for adjustment and defining a female center, said center member having a bearing portion adapted to be seated on the male centers of the machine and a wall portion extending about the female center to define a surface spaced equally from the female center at a plurality of circumferential positions, mounting the work piece on said male centers with the female center members bearing on said male centers, gauging any misalignment of said female centers with the work piece in the mounted position, said gauging step including sensing of the positon of said wall portions of the center members at aligned locations at each end of the work piece for a plurality of angular positions of the work piece by means of gauges contacting said wall portions, algining said female centers by adjustment of said female centers relative to each other until the high readings of the gauges sensing the wall portions at each end of the work piece are approximately in alignment, and subsequently adjusting said female centers to a central location with respect to the work piece while in said mounted position, said last-mentioned step involving gauging of the location of the female center with respect to the work piece by gauging means contacting the periphery of the work piece at each end of the work piece.

3. The method of positioning a work piece in a machine such as a lathe, grinder or the like comprising the steps of aligning the headend and tailend male centers of the machine at a close position, said tailend male center being mounted on an adjustable center assembly, retracting the tailend male center to a position for receiving the work piece, realigning said male centers at said retracted position by adjusting the position of the tailend center by means of the adjustable center assembly, placing adjustable female center assemblies at the ends of the work piece, said female center assemblies having a center member mounted for adjustment and defining a female center, said center member having a bearing portion adapted to be seated on the male centers of the machine and a wall portion extending about the female center and concentric therewith, mounting the work piece on said male centers with the female center members bearing on said male centers, gauging any misalignment of said female centers with the work piece in the mounted position, aligning the female centers, said aligning step including rotation of the work piece while gauging the spacing of said wall portions from the male centers at aligned points at each end of the work piece to determine any eccentricity, and adjustment of said center members until the high gauging readings at each end of the work piece are in approximate alignment, said steps being repeated alternately until alignment within the desired accuracy is achieved whereby wobble of the work piece during rotation is minimized, and subsequently adjusting said female centers to a central location with respect to the work piece, said last-mentioned step involving gauging of the location of the female center with respect to the work piece by gauging means contacting the periphery of the work piece at each end of the work piece.

4. The method of positioning a work piece in a machine such as a lathe, grinder or the like comprising the steps of aligning the headend and tailend male centers of the machine at a close position, said tailend male center being mounted on an adjustable center assembly, retracting the tailend male center to a position for receiving the work piece, realigning said male centers at said retracted position by adjusting the position of the tailend center by means of the adjustable center assembly, placing female center assemblies at the ends of the work piece, said female centers being of a type having a female center defining member mounted for adjustment and having a wall portion adapted to be contacted by gauging means to indicate the position of the female center, determining any misalignment of said female center at each end of the work piece by gauging the position of the wall portions of each center member with respect to the male center engaging the same, aligning said female centers by repeated steps of adjustment of the center members and of gauging the position of said female centers by means of said wall portions until the gauging step indicates alignment of said female centers within the desired amount of accuracy, and subsequently adjusting said female centers to a central location with respect to the work piece, said last-mentioned step involving gauging of the location of the female center with respect to the work piece by gauging means contacting the periphery of the work piece at each end of the work piece.

5. The method of positioning a work piece of considerable length such as around four feet or greater in a machine such as a lathe, grinder or the like comprising the steps of aligning the headend and tailend male centers of the machine at a close position to an accuracy within one thousandth of an inch, said tailend male center being mounted on an adjustable center assembly, retracting the tailend male center to a position for receiving the work piece, determining any misalignment of said male centers by comparing means indicating the position of each male center, realigning said male centers to an accuracy within one thousandth of an inch at said retracted position by adjusting the position of the tailend center by means of the adjustable center assembly, placing adjustable female center assemblies at the ends of the work piece, said female center assemblies having a center member mounted for adjustment and defining a female center, said center member having a bearing portion adapted to be seated on the male centers of the machine and a wall portion extending about the female center to define a surface spaced equally from the female center at a plurality of circumferential positions, mounting the work piece on said male centers with the female center members bearing on said male centers, gauging any misalignment of said female centers in said mounted position, said gauging step including sensing of the position of said wall portions of the center members at aligned locations at each end of the work piece for a plurality of angular positions of the work piece by means of gauges contacting said wall portions, aligning said female centers by relative adjustment of said female centers until the high readings of the gauges sensing the wall portions at each end of the work piece are approximately in alignment and subsequently adjusting said female centers to a central location with respect to the work piece, said last-mentioned step involving gauging of the location of the female center with respect to the work piece by gauging means contacting the periphery of the work piece at each end of the work piece.

6. The method according to claim 5 in which the step of placing the female center assemblies on the work piece includes squaring the ends of the work piece and squaring said center assemblies on the ends of the work piece with a high degree of accuracy.

7. The method according to claim 2 comprising, at the close position of said male centers, the steps of mounting a sighting means on one of said male centers in a position spaced from said one center axis, mounting a target means on the other of said male centers in a position spaced from said other center axis the same spacing as said sighting means from the axis of said one center, adjusting said sighting means to sight on the center of said target means, and in which said step of realigning the male centers at the retracted position includes adjusting the position of said retracted male center until said sighting means sights on the center of said target means.

References Cited by the Examiner

UNITED STATES PATENTS

| 2,247,721 | 7/41 | Wright | 82—33 |
| 2,268,983 | 1/42 | Gilmore et al. | 82—1 |
| 2,309,260 | 1/43 | Strauss | 82—1 |
| 2,342,828 | 2/44 | Armitage et al. | 29—26 |
| 2,378,811 | 6/45 | Vinner | 82—33 |
| 2,809,044 | 10/57 | Landreth | 82—45 X |

OTHER REFERENCES

Machine Tool Operation—Part I, 4th edition, McGraw-Hill, N.Y., 1953. (Copy in Div. 13.)

WILLIAM W. DYER, JR., *Primary Examiner.*

THOMAS E. BEALL, RICHARD H. EANES, JR.,
*Examiners.*